Jan. 21, 1930.  W. J. PATTERSON  1,744,412
ANIMAL TRAP
Filed March 9, 1928

Inventor.
W. J. Patterson
By Egerton R. Case
Atty.

Patented Jan. 21, 1930

1,744,412

UNITED STATES PATENT OFFICE

WILLIAM JAMES PATTERSON, OF ALLANDALE, ONTARIO, CANADA

ANIMAL TRAP

Application filed March 9, 1928. Serial No. 260,388.

My invention relates to improvements in animal traps, and relates more particularly to baitless traps used to catch animals swimming in the water, and without subjecting the same to pain or injury, and the object of my invention is to design a trap which will be located in a stream of water so as to catch animals swimming therein whether they be going up or down stream. Another object of my invention is to design my trap so that young and small animals though they may enter the trap may readily escape therefrom, and in the following specification and the drawings forming part thereof, I shall describe and illustrate my preferred form of invention, and what I claim as new will be set forth in the claims forming part of this specification.

Figure 1:
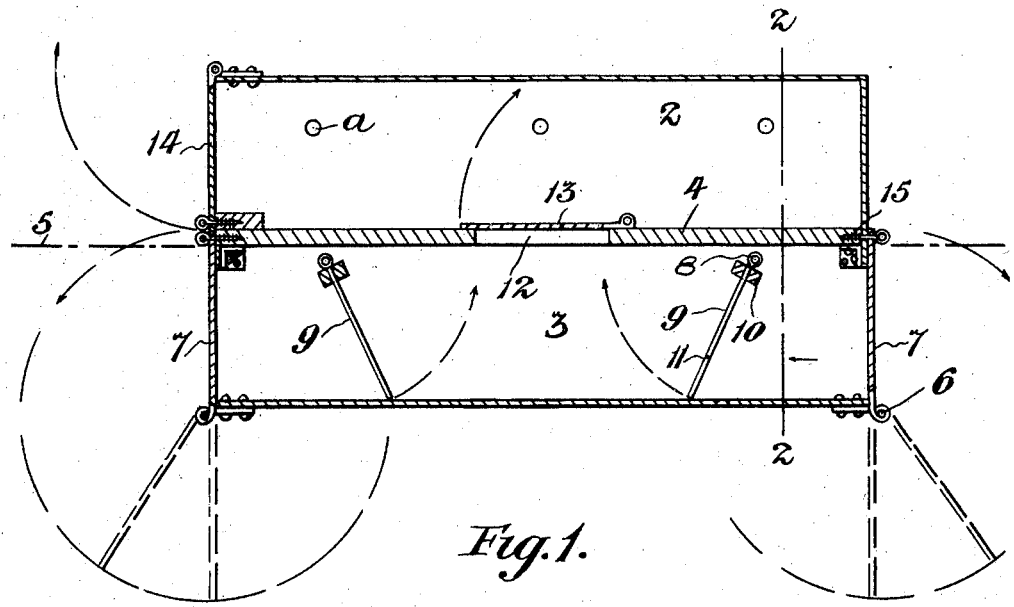
Figure 2:
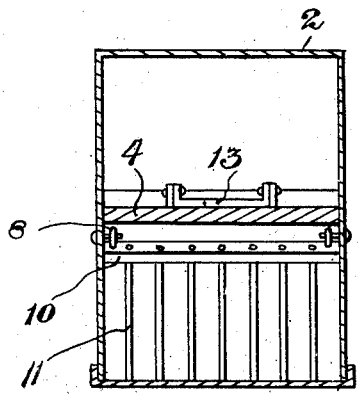

Fig. 1 is a vertical central longitudinal section through my preferred form of trap, and Fig. 2 is a vertical cross section on the line 2—2, Fig. 1.

In the drawings, like characters of reference refer to the same parts.

This trap is adapted for use only in water, and it may be made of wood or metal, and the particular manner of mounting or hinging the doors, and the securing of the component parts together are not germane to the invention, as I may employ various forms of construction in the making of the trap.

According to my preferred form of invention the trap comprises upper and lower chambers 2 and 3 which are separated by a partition 4 which is made of wood, of sufficient buoyancy to keep the chamber 2 above water level which is indicated by the line 5. Hinged at each end of the chamber 3 as at 6 are doors 7. Pivoted as shown at 8 to the side walls of the lower chamber 3 are one or more gates 9. These gates preferably comprise bars 10 in which are held rods 11 spaced apart at the required distance so that young and small animals that enter the chamber 3 may readily escape thereoutof.

The trap is set in a stream of water, and it is supported at the required height, that is, so as to keep the chamber 2 above water level by means of the doors 7 which are opened and pressed into the soil at the bottom of the creek. The current in the streams in which this trap is designed to be used, is quite sluggish, and the water is not very deep. The said doors when properly positioned will maintain the chamber 2 at water level, and it will be understood as indicated by dotted lines in Fig. 1 that the doors 7 can be held at the required angle to the bottom of the chamber 3 and so regulate the location of the partition 4 with respect to the water level.

The doors 7 not only hold the trap at the required level in the water, but they also prevent the animal from diving underneath the trap.

When the animal enters at either end of the chamber 3, it will pass by one of the gates 9, and as there is an opening 12 in the partition 4, the animal will enter this opening and by raising the trap door 13 it will enter the chamber 2. This door 13 when the animal gets out of the way thereof will drop back by gravity to close the opening 12.

14 is a door at one end of the chamber 2 by means of which the animal trapped within the chamber 2 may be removed therefrom.

The various doors may be fastened shut in any suitable manner. A very convenient means for this purpose I have illustrated in the form of an eye having a threaded shank 15 which screws into the partition 4.

Although I show two doors 7 and two gates 9 so as to capture animals coming in either direction, I may only use one door 7 and one gate 9.

Though I have shown the chamber 2 as made of sheet metal with air holes $a$ therein, I may make the walls of the chambers 2 and 3 of wire netting suitably reinforced.

What I claim as my invention is:

1. An animal trap designed to be used in water only embracing upper and lower chambers; a buoyant partition separating said chambers, and having an opening therethrough; means controlling said opening; doors hinged at each end of said lower chamber and adapted to be inserted in the soil in the bottom of a creek the required distance, and means pivoted within said chamber in front of the opening at each end thereof and adapted to permit an animal to pass thereunder and ultimately drop back to normal position to trap the same.

2. An animal trap embracing a chamber open at one end, the said chamber adapted to be submerged in water; another chamber above said first-mentioned chamber and having controlled communication therewith; buoyant means intermediate said chambers whereby said second-mentioned chamber is supported above the level of the water, and an apertured gate pivoted within said submerged chamber and adapted to permit an animal to pass thereunder and trap same in said submerged chamber, the apertures in said gate being for the purpose of permitting young and small animals to pass therethrough out of the trap.

WILLIAM JAMES PATTERSON.